United States Patent [19]

van den Berg

[11] 4,161,484

[45] Jul. 17, 1979

[54] FRACTIONATION OF GLYCERIDE OILS BY COOLING AND UNDER HOMOGENEOUS AGITATION

[75] Inventor: Hendrikus J. van den Berg, Terheyden, Netherlands

[73] Assignee: Lever Bros. Co., New York, N.Y.

[21] Appl. No.: 890,888

[22] Filed: Mar. 28, 1978

Related U.S. Application Data

[63] Continuation of Ser. No. 756,687, Jan. 4, 1977, abandoned.

[30] Foreign Application Priority Data

Jan. 8, 1976 [GB] United Kingdom .................. 651/76

[51] Int. Cl.$^2$ ............................ C09F 5/10; C11B 3/00

[52] U.S. Cl. ................................ 260/428.5; 260/428; 260/419; 210/49

[58] Field of Search ..................... 260/419, 428, 428.5; 208/37; 210/49

[56] References Cited

U.S. PATENT DOCUMENTS

| | | | |
|---|---|---|---|
| 2,441,200 | 5/1948 | Langhurst | 210/19 |
| 2,903,411 | 7/1959 | Shuman | 208/37 |
| 3,159,563 | 1/1964 | Anastasoff | 208/37 |
| 3,953,484 | 4/1976 | Sutker | 260/419 |

OTHER PUBLICATIONS

Zuiderweg et al., "The Chemical Engineer", Jul./Aug., 1968, pp. 223–227.

*Primary Examiner*—John Niebling
*Attorney, Agent, or Firm*—James J. Farrell; Melvin H. Kurtz; Kenneth F. Dusyn

[57] ABSTRACT

Fractionation of glyceride oils is effected by cooling under the influence of homogeneous agitation by stirring, particularly by means of a cylindrical stirrer concentric with a chamber containing the oil, with the development of crystalline agglomerates of lower-melting fractions of the oil which are easily separated from the oil by filtration and if desired by washing. Heavy crops of crystal fractions can be separated containing up to 35 wt % solids, for the preparation for example of margarine fats from vegetable fats which may be hardened before or after fractionation.

18 Claims, No Drawings

FRACTIONATION OF GLYCERIDE OILS BY COOLING AND UNDER HOMOGENEOUS AGITATION

This is a continuation of application Ser. No. 756,687, filed Jan. 4, 1977 now abandoned.

GENERAL DESCRIPTION OF THE INVENTION

The invention concerns the separation of solid particulate matter from fatty material in liquid phase in which it is dispersed.

The refining and fractionation of fatty materials such as fats and fatty acids involves the separation from it of solid particulate matter dispersed in the fatty material. In particular, fatty material may be separated into preferred and less-preferred fractions for use in the food industry, by selective precipitation from the liquid condition, usually by cooling and often from solution in suitable solvents. The art is highly developed in such fields as the margarine and confectionery fat industries but emphasis has been placed hitherto on the desirability of effecting good heat transfer between the cooling surfaces and the fatty material during the precipitation of the solid particulate matter, by the provision of effective stirring of the material and the removal of precipitate accumulating on the cooling surfaces, using stirrer means conducive to heterogeneous agitation, usually in the form of paddles, scrapers or stirrers with an irregular profile extending, in the case of scrapers, to contact the cooling zone.

The methods developed in the art to date often produce crystals habits which are very slow to filter, even with centrifuging and are tenacious of the mother liquor from which it is to be separated. This often limits the proportion of precipitate that can be successfully separated. Washing to assist separation is apt to be slow, expensive and wasteful, besides incurring the need to recover solvent where this is used.

The present invention provides a method of treating fatty material containing solid particulate matter which improves separation of the two.

THE PRIOR ART

The classical fractionation of an important vegetable oil such as palm oil for the food industry is well illustrated by British Patent No. 827,172. Later separation methods involving only partially dissolving the fat, are disclosed in British Patent No. 953,453. Other fractionation methods combining with hydrogenation to modify the properties of the fractions recovered are disclosed for example by Kawada et al U.S. Pat. No. 3,686,240 and Feuge U.S. Pat. No. 3,431,116.

Agglomeration techniques for improving the filtration of soot dispersed in water is disclosed in Chem. Eng. 1968, pages 223-7 by Zuiderweg and Campagne, who added an auxiliary water-immiscible fluid to the system which was then agitated.

In U.S. Pat. No. 2,441,200 a technique for separating prepared seed from miscella is disclosed in the extraction of oil-based seeds. No application of agglomeration techniques for fat fractionation, for the purpose of improving yield of oleine, i.e. lower-melting fraction and the quality of stearine, i.e. upper-melting fraction, has however been disclosed.

This invention relates to separating solid particulate matter from fatty material, particularly fatty acids and their esters, especially fats. More particularly the invention relates to fractionation processes applied to such substances.

The separation of solid particulate matter from liquid fatty material in which it is dispersed is effected in the course of refining and fractionation operations. In the latter, selected fatty acids or glycerides in fats or glyceride oils may be precipitated as solid particles, usually by cooling and separated for example by filtration from others remaining in liquid phase, sometimes dissolved in solvents.

In these operations the separation of the solid and liquid phases is often slow; the precipitate on the form of particles may retain a high proportion of the liquid component of the fatty material by adsorption and drainage of liquid phase components from it may be poor, even with centrifugation, especially in recrystallisation operations. Repeatedly washing the solid matter to remove the liquid clinging to it may be necessary but takes up more time and is extravagant of solvent.

Although, therefore, more complete separation may be highly desirable, whether to improve the quality of the solid phase or the yield of the liquid, it is in any case time-consuming and expensive and may even be impractical.

In the process of the present invention the particulate matter is converted to an aggregate form more readily separated from the liquid phase by draining, the process comprising subjecting fatty material in liquid form containing the particulate matter dispersed therein, to homogeneous agitation until a substantial amount of the particulates is aggregated, and separating the liquid fatty material therefrom.

Homogeneous agitation occurs when the velocity gradient between any two particles in the mixture adjacent radially to one another is the same. Under the influence of the homogeneous agitation the particles of the solid phase coalesce in agglomerates which are much more easily drained of adherent liquid phase in the subsequent separation operations.

Homogeneous agitation is preferably effected by a stirrer with a smooth profile. Turbulence in the fatty material undergoing homogeneous agitation should be minimised. Homogeneous agitation, giving streamline flow is provided by a stirrer with a smooth and regular profile, as by a cylindrical stirrer concentric with and rotating in a chamber containing the fatty material, on a vertical, inclined or horizontal axis.

The radial dimensions of the stirrer are not critical, but small stirrers may be slower to affect aggregation, other things being equal. Preferably the stirrer is from one-third to two-thirds the diameter of the agitation chamber, particularly about half its diameter, but it preferably extends substantially the full depth of the fatty material in the chamber, to ensure complete stirring. The depth is itself not critical in relation to the radial dimensions, at least in batch operations, but it is at any rate preferably at least as great as the radial width of the annulus of fatty material enclosed between the walls of the chamber and the stirrer, more particularly twice as deep or more. A particular feature of the invention is that no auxiliary fluid is required to promote aggregation of the particles.

The speed of the stirrer should preferably be as slow as is consistent with achieving the desired effect, preferably from 1 to 200, especially 10 to 100 r.p.m., preferably corresponding to a velocity gradient of from 1 to 250 m/min/m, especially 10 to 100 m/min/m. radially. Where the observed aggregation is unduly slow to develop with a small stirrer, it is best to replace it with a bigger stirrer operated at the same or slower speeds, to obtain quicker aggregation.

The process is suitable for batchwise or continuous operation but in the latter event preferably the chamber is deep relative to the annulus width to provide several mixing stages in the annular zone containing the fatty material and combine good mixing with maximum contact between the liquid and solid material.

The invention is of particular importance for fractional crystallisation of fatty acids and their esters, especially fats. These include glyceride oils which are normally liquid. Fractional crystallisation may be applied to remove impurities or to separate particular fractions of the fatty material having desired melting characteristics and may be carried out in the presence or absence of solvent for the fatty material, although the process is particularly valuable in so-called dry fractionation processes in the absence of a solvent, when substantially longer filtration times are incurred due to the high viscosity of the liquid oleine fraction. This may be separated by washing the crystals with an aqueous dispersion of a suitable surfactant as in the so-called Lanza process. Suitable solvents for fat fractionation include acetone, hexane or nitropropane and methanol for fatty acids, preferably containing a little water. The amount of solvent may vary from 5:1 to 1:2 by weight relative to the fatty material. Other solvents known in the art may also be used.

Preferably the fractional crystallisation is effected in situ during homogeneous agitation, the fatty material being cooled from a wholly liquid or dissolved condition until crystallisation of the fraction to be separated is complete, at the same time subjecting the material to homogeneous agitation. Apparatus for the purpose preferably comprises a stirring chamber fitted with a coaxial stirrer, both of smooth cylindrical shape and size as described, and cooling means for cooling for contents of the chamber, preferably through the walls of the chamber and of the stirrer. A lower limit may be necessary to the speed of rotation of the stirrer, in order to ensure adequate heat transfer and avoid excessive deposition of crystal growth on the cooling surfaces, which hampers heat transfer. In contrast to many forms of crystallisation apparatus, the stirrer should not scrape the walls of the cooling chamber. Such means do not provide homogeneous agitation.

The cooling rate is also affected by the temperature differential between the cooling surface and the fatty material. Large temperature differentials promote rapid cooling but with the formation of micro-crystalline growth. Small temperature differentials, on the other hand, produce larger crystals but much more slowly. Temperature differentials specified in this specification are measured to the centre of the liquid and are preferably below 10° C. measured radially. A temperature differential of from 5 to 20 centigrade degrees, preferably 5 to 10 centigrade degrees, is preferably maintained between the coolant and the body of the liquid undergoing cooling, at least until crystals appear. Thereafter a higher differential can be provided, but preferably not exceeding 25 centigrade degrees, especially 10 to 20 centigrade degrees.

The invention may be applied to both edible and nonedible vegetable, animal and marine fats, their fractions and hydrogenated and interesterified derivatives and their constituent fatty acids, for example tallow, palm, sunflower, safflower, groundnut, soyabean and lauric oils.

The invention is useful for carrying out winterisation. This is a form of fractional crystallisation commonly applied to edible oils, for example palm or cottonseed oil, or soyabean oil which is slightly hydrogenated to improve its resistance to deterioration in storage, which are intended for use as salad oils or frying oils, to prevent the onset of turbidity on standing at ambient temperatures, due to the fractional crystallisation of a higher-melting stearine fraction in the oil. In winterisation processes the stearine is removed by filtration after cooling the oil but substantial losses can be incurred in conventional winterisation processes for the reasons above stated, in the separation of the oleine and stearine fractions and in any case a small amount of the stearine often stubbornly remains in the oil, to crystallise out later in storage, unless the oil is cooled to much lower temperatures, with the loss of even more oil. The present invention provides an economic and efficient winterisation process, incurring minimum oil losses and providing maximum effectiveness.

The invention is also effective for fractionating fatty material for the recovery of a substantial proportion of higher-melting solid fraction in a single fractionation, as much as a quarter of the total weight of the fatty material. In conventional practice the solid fraction commonly absorbs at least twice its own weight of the lower melting, liquid fraction. Solid fractions of above about a quarter of the total weight treated therefore form slurries, the separation of which into their constituent liquid and solid fractions is extremely difficult, whether by filtration of centrifugation. In accordance with the present invention the crystals are aggregated together and retain a substantially lower portion of the liquid fraction.

The process of the invention may be carried out at temperatures for example from −20° C. to 50° C., temperatures being limited only by the physical limits of solvents, where these are used, and the amount of solids to be removed, not more than 35% being preferred this and other percentages referred to in this text being by weight. Separation of the agglomerated solid matter may be, for example, by decantation or by gravitation or pressure filtration or by centrifugation.

The invention is of particular importance for the recovery of fat fractions having desired attributes for use in the food industry. In the formulation of margarine fats for example blends are often prepared of fats obtained by fractionation procedures to meet desired physical or chemical characteristics. The fats may for example be required to meet specified melting characteristics, or a high polyunsaturated fatty acid content may be required for dietary purposes. Careful fractionation in accordance with the invention enables fats to be obtained to meet such requirements. In the confectionery industry also hard butters are obtainable with the critical melting performance required of fats used for this purpose, by fractionation in accordance with the invention, particularly from palm oil but also from other vegetable fats which may be hardened before or after fractionation.

EXAMPLE 1

A cylindrical crystalliser chamber fitted with a dished base and a cover plate was also provided with a cylindrical rotor, fixed to a vertical rotor shaft extending into the chamber, which was rotatable by motor means mounted above the plate and was supported in bearings located in the centre of the cover plate and the dished base of the chamber.

The chamber was approximately half as deep again as it was wide and the rotor, extending substantially the full depth of the chamber, half as wide as the chamber. The chamber itself was fitted with an external cooling jacket in which aqueous ethylene glycol solution, cooled to a predetermined temperature, could be circulated.

Soyabean oil was lightly hydrogenated to an Iodine Value of 110 to 112 using a fresh, supported nickel catalyst. This improves the stability of the oil against oxidative deterioration but leads to cloudiness in the oil on standing, due to the crystallisation of a stearine fraction. This was removed from the oil in accordance with the invention using the apparatus described.

After removing the catalyst the oil was cooled to 36° C. and charged to the crystalliser chamber. The agitator was rotated to give a velocity gradient of about 15 meters/minute/meter in the liquid in the annulus. Aqueous ethylene glycol circulated in the cooling jacket was maintained to provide a temperature gradient of 20° C./meter measured radially through the oil, to a measuring point midway between the walls of the vessel and the rotor. When the temperature reached 21° C. crystals appeared and the temperature differential increased to 35° C./meter until a final temperature of 3° C. was reached. The oil was then filtered through a standard vacuum filtration unit, yielding 74% of an oleine in 3 hours, by weight of the hydrogenated oil. The oleine remained clear at 0° C. for at least 5 hours. On the other hand the hydrogenated whole oil deposited stearine crystals even on standing at 20° C.

In a comparative trial using conventional fractionation methods incorporating an agitator in the vessel instead of the rotor stirrer and scraping attachments for removing crystalline material forming on the walls of the vessel, conditions were adjusted to give a similar filtration time, but a yield of only 60% was obtained. The oleine product in both instances was suitable for use as a frying oil, remaining clear in storage at ambient conditions.

EXAMPLE 2

A series of experiments was carried out by fractionating similar hardened soyabean oil, charged at 30° C. in similar equipment, comprising a chamber 60 cm diameter and 1 meter high, fitted with a rotor stirrer 30 cm diameter. The effect was observed on filtration speed and oleine yield of fractionation temperature and temperature differential which, however, remained constant in each experiment, in all of which the rotational speed was 42 r.p.m. corresponding to a velocity gradient of 264 m/hour/m. The effect was also observed of "stabilisation" by maintaining the cooled fat for 2 hours at the fractionation temperature.

From all the experiments an oleine was obtained which remained clear at 0° C. after 5 hours. Further particulars appear in the Table below.

TABLE

| | Cooling Conditions | | | | | |
|---|---|---|---|---|---|---|
| Experiment | Diffl. °C. | Stabilisation time (hours) | Final °C. | Time (hours) from 30° C. | Yield Oleine % | Filtration rate m³/m²/h. |
| 1 | 3-4 | — | 0 | 10 | 67.6 | 5.2 |
| 1a | | 2 | | 12 | 65.7 | 4.0 |
| 2 | 10 | — | | 6 | 63.6 | 0.99 |
| 2a | | 2 | | 8 | 60.8 | 0.68 |
| 3 | 6 | — | −1.5 | 7 | 61.3 | 0.63 |

Experiments 1 and 2 demonstrate the marked decrease in filtration speed and considerable increase in oleine yield that follows when Δt is reduced, for the same final temperature. Comparison of Experiments 1 and 1*a* and again 2 and 2*a* surprisingly shows that a "stabilisation" period at the fractionation temperature is deleterious, contrary to conventional fractionation practice. Finally, Experiment 3 also shows that a good oleine yield can be obtained, comparable with Experiment 2*a*, even at the lower temperature of −1.5° C., by maintaining a lower Δt and avoiding a prolonged stabilisation temperature.

EXAMPLE 3

Palm oil (I.V. 53) was stirred at 100 r.p.m. in a cylindrical vessel twice as deep as wide, fitted with a cooling jacket and a coaxial cylindrical rotor extending substantially the full depth of the oil, the diameter of the rotor being half that of the vessel. From 50° C. the oil was cooled at 12° C. per hour to 28° C., at which temperature it was maintained with continued stirring for 5½ hours, when NMR analysis of a sample showed 8% solids formed. The oil was filtered at the same temperature, with a flow rate of above 10 m³/m² per hour at a filtration pressure of 0.5 atmospheres.

The filtrate was 80% of original palm oil, leaving a residue of 20% retained by the filter.

The Example was repeated in continuously operating equipment of the same proportions, using a stirrer speed of 40 r.p.m., 9% solids being reported and the filtrate again amounting to 80% of the original oil, with an Iodine Value of 57 and a filtration rate of 6.5 m³/m² per hour. Residence time was 2 hours.

At a crystallisation temperature of 13° C. and a stirrer speed of 80 r.p.m., a yield of 45% liquid fraction was recovered from the continuous equipment, with an I.V. of 63.2 to filtration rate of 0.5 m³/m² per hour. This is an excellent recovery considering the heavy residue to be removed. Residence time was 5 hours.

EXAMPLE 4

Malayan palm oil fraction (I.V. 58.4), obtained by dry fractionation of palm oil, was mixed with four times its weight of acetone and fractionated at 3° C. by cooling in the batch apparatus described in Example 3, from 50° C. to 3° C. at the rate of 12° C. per hour with stirring at 300 r.p.m. After stirring for 3 hours at this temperature filtration was rapid and the filtration residue was washed four times, each time with 1½ times the weight of starting oil, of acetone. After evaporating off solvent a residue of 36% (I.V. 41.3) was obtained with a filtrate oil yield of 64% (I.V. 68.5), based on the starting oil.

EXAMPLE 5

Example 4 was repeated at −6° C., cooling from 30° C. with 5 hours' stabilisation, using as solvent an equal amount by weight of hexane. After washing the filtration residue twice, each time using an equal amount by weight of the starting oil of hexane, and evaporating off the solvent, a filtrate oil of 64.1% by weight of the starting oil was recovered of I.V. 67.8 and a residue of 35.9% of I.V. 43.2.

EXAMPLE 6

Tallow fatty acids of I.V. 56 were dissolved in 1½ times their weight of a mixture of 92% methanol with 8% water and fractionated in the apparatus described in Example 3, by cooling from 30° C. to −7° C. at a cooling rate of 18° C. per hour with stirring at 200 r.p.m. and immediately thereafter filtered off as before and washed twice with the same solvent, each time with 88% of the original weight of acid. After evaporating of the solvent a filtrate of I.V. 95.2 in 56.1% yield was recovered together with 43.9% filtration residue of I.V. 5.8, obtained as a free-flowing granular material 92% of the particles of which had a diameter about 0.5 mm.

What is claimed is:

1. A process for fractionating fatty material comprising cooling said fatty material from a wholly liquid condition, in a cooling zone defined between the inner walls of a chamber and a stirrer having a smooth profile mounted in said chamber, to a temperature at which partial crystallization of said fatty material takes place while agglomeration of crystals resulting from homogeneous agitation occurs in said cooling zone; and separating agglomerated fat crystals thus formed from the remaining liquid fatty material.

2. Process according to claim 1 in which homogeneous agitation is provided in a chamber containing the fatty material by a cylindrical stirrer concentric therewith.

3. Process according to claim 2 in which the chamber is cylindrical and one-and-a-half to three times the diameter of the stirrer.

4. Process according to claim 3 in which the chamber is at least as deep as the radial width of the fatty material enclosed in the chamber between the walls thereof and the stirrer.

5. Process according to claim 2 in which the stirrer is rotated at a speed providing a velocity gradient from 1 to 250 m/minute/m radially.

6. Process according to claim 5 in which the velocity gradient is from 10 to 100 m/minute/m radially.

7. Process according to claim 2 in which the stirrer is rotated at a speed from 10 to 100 r.p.m.

8. Process according to claim 1 in which the agglomerated fat crystals comprise components of the fatty material which are selectively precipitated while the fatty material is subjected to homogeneous agitation.

9. Process according to claim 8 in which a temperature differential below 10° C. measured radially is applied to cool the fatty material.

10. Process according to claim 9 in which the fatty material is maintained at constant temperature after cooling to stabilise the precipitate.

11. Process according to claim 8 in which from 5 to 35 wt % of the fatty material is precipitated.

12. Process according to claim 1 in which the fatty material comprises fat.

13. Process according to claim 12 in which the fat comprises palm oil or a fraction thereof.

14. Process according to claim 12 in which the fat comprises soyabean oil.

15. Process according to claim 1 in which a solvent for the fatty material is present.

16. Process according to claim 15 in which the solvent is selected from the group consisting of hexane, acetone and nitropropane.

17. Process according to claim 15 in which the amount of solvent present is from ½ to 5 parts by weight of the fatty material.

18. Process for fractionating fatty material selected from mixtures of fatty acids and their triglycerides comprising the steps of (a) retaining the fatty material in wholly liquid condition in an annular space defined between the walls of a cylindrical chamber and a cylindrical stirrer coaxial therewith and spaced therefrom which extends into the chamber, the stirrer having a diameter from ⅓ to ⅔ that of the chamber and the quantity of fatty material being such that the depth of the liquid in the chamber is at least twice the radial width of the said annular space;

(b) cooling the fatty material through the surfaces in contact therewith to a temperature from −20° C. to 50° C. at which a proportion not exceeding 35 wt % is precipitated from the mother liquor fatty material in the form of solid particulate matter while simultaneously rotating the stirrer at a speed at which homogeneous agitation takes place;

(c) continuing the homogeneous agitation to agglomerate the particulate matter, and (d) separating the agglomerated particulate matter from the mother liquor.

* * * * *